Figure 1:
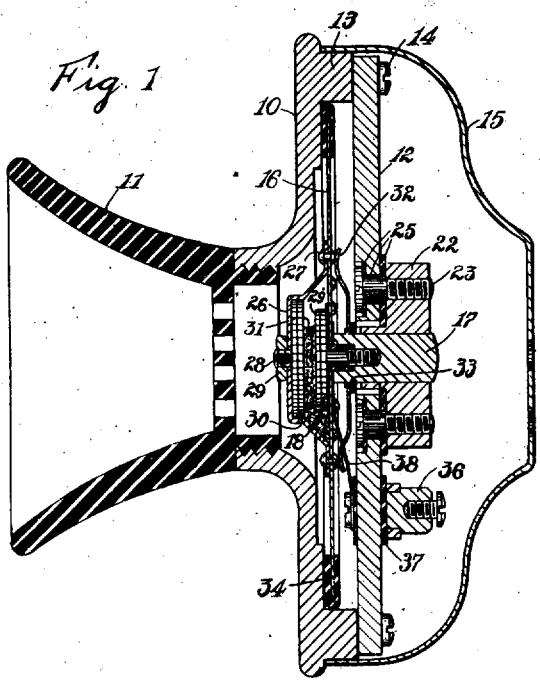

W. KAISLING.
TELEPHONE TRANSMITTER.
APPLICATION FILED MAR. 15, 1906.

903,197.

Patented Nov. 10, 1908.

2 SHEETS—SHEET 1.

Witnesses
Geo. E. Mueller.
H. C. Olmstead.

Inventor
William Kaisling
Thomas H. Ferguson
Attorney

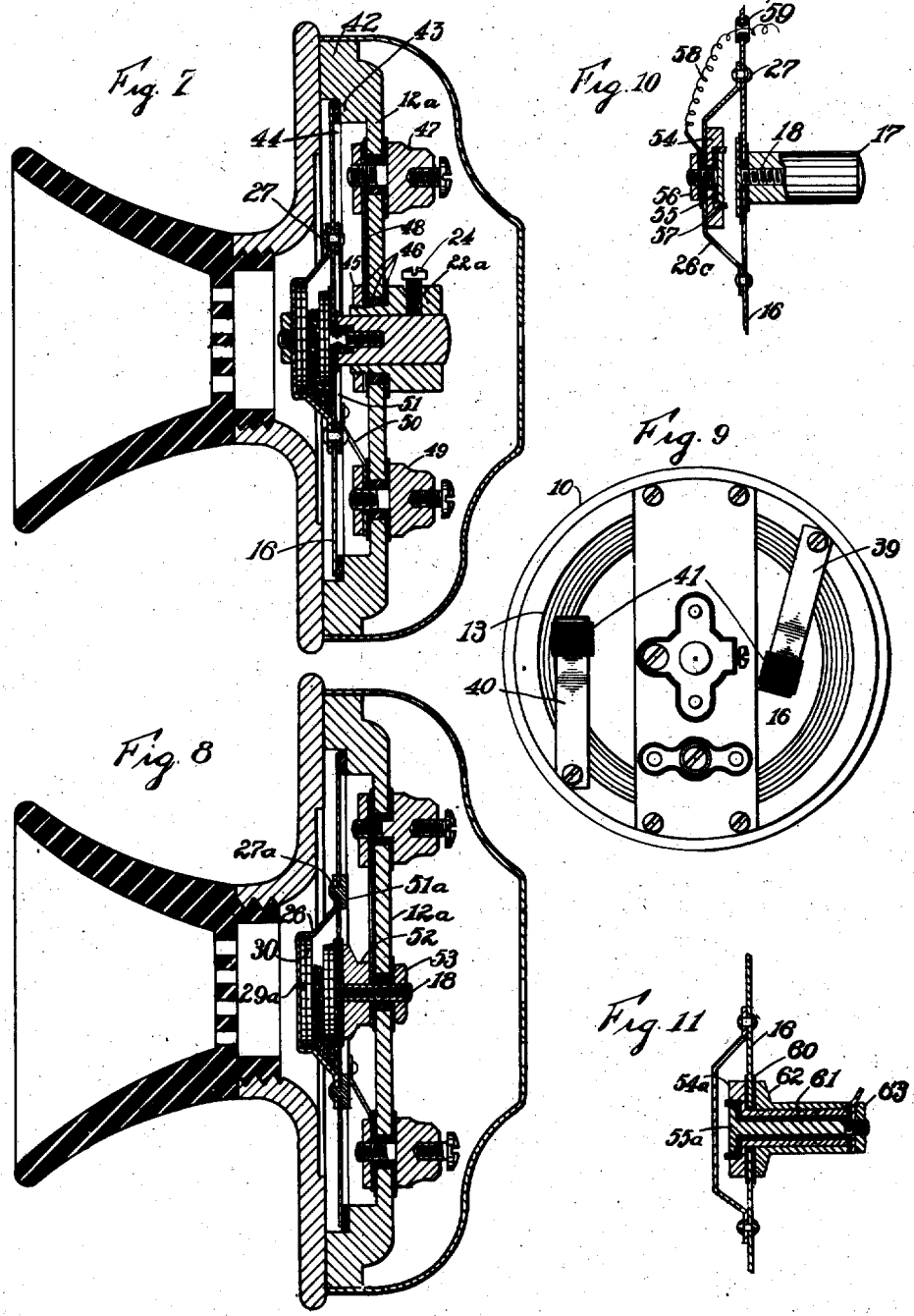

UNITED STATES PATENT OFFICE.

WILLIAM KAISLING, OF CHICAGO, ILLINOIS, ASSIGNOR TO MILO G. KELLOGG, OF CHICAGO, ILLINOIS.

TELEPHONE-TRANSMITTER.

No. 903,197.    Specification of Letters Patent.    Patented Nov. 10, 1908.

Application filed March 15, 1906. Serial No. 306,239.

*To all whom it may concern:*

Be it known that I, WILLIAM KAISLING, a citizen of the United States, and resident of Chicago, county of Cook, and State of Illinois, have invented a new and useful Improvement in Telephone-Transmitters, of which the following is a specification.

The present invention relates to telephone transmitters of the so-called granular type in which a body of finely divided carbon or similar material constitutes the resistance-varying medium of the telephone circuit. In such transmitters, the granular substance is disposed between suitable electrodes and is caused to vary its resistance in substantial accordance with the movements of the sound-receiving diaphragm. Hitherto, transmitters of this type have been employed in which the sound-receiving diaphragm has been provided with an electrode capable of a piston-like action upon the resistance-varying medium contained between it and a fixed electrode within a chamber closed by a thin auxiliary membrane or diaphragm. Such transmitters are complicated in construction; and whether the granules be in bulk carried by the sound-receiving diaphragm, or be contained in a rigidly mounted cup, the presence of the auxiliary diaphragm necessarily distorts the form of the impressed sound wave or its effect on the resistance-varying medium.

The object of my invention is to reduce and simplify the number of parts, so as to more perfectly reproduce speech, and to secure at the same time a reduction in the cost of manufacture. To this end, I omit entirely the supplemental membrane or diaphragm of the art, rigidly connect the center of the sound-receiving diaphragm with the frame of the transmitter while restraining its periphery from free vibration, and include the resistance-varying material in a chamber formed by a cup rigidly attached to the sound-receiving diaphragm, preferably at its point of greatest amplitude of vibration, whereby the resistance-varying medium thus inclosed in the chamber is caused, with a minimum number of moving parts, to vary its resistance more nearly in exact accordance with the sound waves impressed upon the diaphragm. An initial flexure or bias is given to the diaphragm either by means of springs bearing thereagainst, or by drawing its center slightly out of the plane extending through its periphery, and the peripheral walls of the cup are preferably inclined to the plane of the diaphragm, so as to enable its connection thereto at a point some distance from its center, while at the same time employing electrodes of relatively small diameter and a small mass of the granular material.

The various features and objects of the invention will be more apparent upon consideration of the following detailed description taken in connection with the accompanying drawing, and the scope of the invention will be particularly pointed out in the appended claims.

Figure 2:
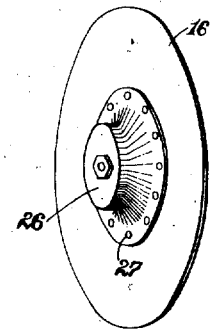
Figure 3:
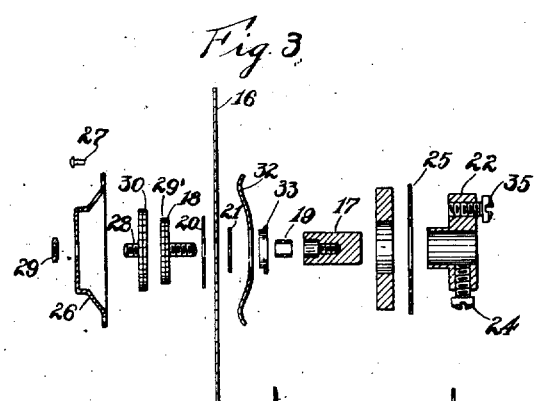
Figure 4:
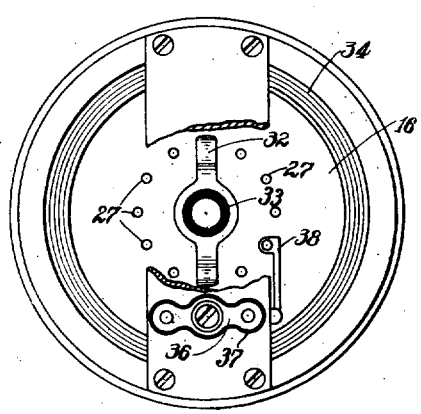
Figures 5, 6:
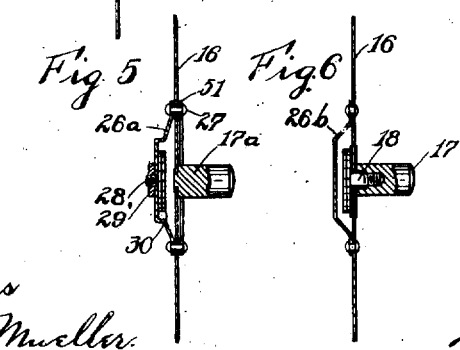

Figure 1 of said drawing is a sectional view of a transmitter constructed in accordance with the invention; Fig. 2 is a perspective view of the diaphragm and its attached granule cup; Fig. 3 is an exploded view of the principal parts of the transmitter; Fig. 4 is a rear view of the transmitter with parts broken away for clearness; Figs. 5 and 6 are sections of modified diaphragm and cup constructions in which the front and rear electrodes, respectively, of Fig. 1, are omitted; Figs. 7 and 8 are sectional views of complete transmitters embodying other modifications; Fig. 9 is a rear view similar to Fig. 4, illustrating modified biasing springs; and Figs. 10 and 11 are sectional views similar to Figs. 5 and 6, illustrating different arrangements of concentric electrodes.

Referring to the drawing in detail, and more particularly to Figs. 1 to 4 inclusive, it will be noted that the frame, by which the parts of the transmitter are supported, is made up of a circular front plate 10 of the usual construction, provided with a central threaded opening for the reception of the mouth-piece 11, and a bridge 12 secured to a peripheral flange 13 upon the front plate 10 by screws 14, the flange also forming a seat for the reception of the usual cover or shell 15. Lying within the space between the front plate 10 and the bridge 12 is the sound diaphragm 16, which consists of a plane disk of aluminum or other suitable material provided with a central opening by which it is attached to the stem 17 by a screw 18, whose shank extends through said opening and is screwed into the stem 17. The screw 18 and the stem 17 are insulated from the diaphragm 16 by means of the bushing 19 and washers 20 and 21. By this means, the center of the sound diaphragm 16 is rigidly secured to the stem 17 and the latter, by being in turn rigidly secured to the bridge 12, maintains the center of the sound diaphragm fixed. The connection between the stem 17 and the bridge 12 is provided by extending the stem through an apertured block 22 which is firmly secured to the bridge by the screws 23. The block 22 is provided with a set screw 24 which is adapted to engage the stem 17 to hold the latter in its adjusted position. The block 22 is suitably insulated from the bridge 12 by the insulation 25. The chamber for the granular material is formed on the face of the diaphragm 16 by means of a cup 26, which is mechanically and electrically connected thereto by means of suitable rivets 27. The peripheral wall or walls of this cup are preferably inclined to the plane of the diaphragm, as illustrated, and a screw 28 is located in the bottom of the cup, with its shank extending through an opening therein and secured in place by a suitable nut 29. The screws 18 and 28 preferably have secured to their opposing faces hard carbon disks 29' and 30 which constitute the back and front electrodes, respectively, of the transmitter. A body 31 of suitable granular material, such as finely divided carbon, partially fills the chamber formed between the cup 26 and the adjacent portion of the diaphragm 16. It is desirable, in order to prevent the "packing" of this material, to employ a relatively small amount, and it is also desirable to have it extend well around the fixed electrode. By the inclined peripheral wall of the cup 26, I am enabled to accomplish these results and to obtain a good circulation of the granular material.

In the design of telephone transmitters, it is preferable to give the diaphragm an initial flexure or bias, in order to gain the full advantage of the resiliency of the material of which it is composed. It is also desirable to damp the diaphragm to prevent its vibrating unduly at its natural period. In the form of the invention illustrated in Fig. 1, this is accomplished by means of the leaf-spring 32, which engages the diaphragm in the neighborhood of the rivets 27, where its amplitude of vibration is approximately a maximum. The leaf-spring 32 is expanded near its center and provided with a central opening, through which the stem 17 extends. It is insulated from other conducting parts by means of the flanged washer 33. The diaphragm 16 is provided at its periphery with the usual soft rubber ring 34, which bears against a peripheral bearing surface on the plate 10, and thereby practically holds this portion of the diaphragm against movement. From this, it will be seen that I have a sound diaphragm which is substantially fixed at both its periphery and center. The block 22, through which the stem 17 extends, is provided with a terminal binding screw 35 which is electrically connected to the electrode 30 through the block 22, stem 17 and screw 18. The bridge 12 carries a binding post 36, suitably insulated therefrom by the insulation 37 and connected to the diaphragm 16 by a suitable conductor, such as the flexible strip 38. As illustrated, this connection may be made at one of the rivets 27. The circuit between the binding post 36 and the electrode 29 is completed through the strip 38, the sound diaphragm 16, the cup 26 and the screw 28.

In operation, the sound waves impinge upon the diaphragm, and the resistance-varying material or medium contained in the chamber is caused thereby to alter its resistance between the two electrodes in substantial accordance with the sound waves impressed upon the diaphragm. On account of the almost entire elimination of intermediate parts, the resistance variations thus impressed upon the resistance-varying material are believed to be more nearly in exact accordance with the sound wave vibrations than can be secured with the structures hitherto known.

In carrying out my invention, it will be apparent that many alterations may be made in the structure herein described without departing from the spirit and scope of my invention. For instance, instead of employing a single leaf-spring, such as the spring 32, to give the sound receiving diaphragm its initial bias and to restrain it from undue vibration, I may employ two springs 39 and 40, secured to the flange 13 of the front plate 10 and resting, at their free ends, upon the diaphragm 16, as illustrated in Fig. 9, in this instance the springs being insulated from the diaphragm by suitable insulating pads 41. The same effect may also be given to the diaphragm without the employment of springs. Such a construction is illustrated in Figs. 7 and 8, where the flange 13 of Fig. 1 is replaced by a flange 42, carried by the bridge 12$^a$ and having an overhanging portion 43 adapted to positively engage the rear side of the diaphragm 16 while being insulated therefrom by a suitable insulating strip 44. The center of the diaphragm, which is secured in the manner heretofore described, is drawn rearward and held in position by the set screw 24 extending through the block 22$^a$ into engagement with the stem 17. By means of this set screw, the extent of the bias or flexure of the diaphragm may be varied. In this instance, the block 22$^a$ is secured to the bridge 12 by means of a nut 45 engaging the forward end of its shank, and is suitably insulated therefrom by means of insulation 46. This block is electrically connected to a binding post 47 by a conducting strip 48, and the diaphragm 16 is electrically connected to a second binding post 49 by a similar conducting strip 50. In this instance, the rivets 27, by which the cup 26 is attached to the diaphragm, also extend through a ring 51.

Under some circumstances, it may be desirable to give the diaphragm 16 a fixed flexure, without adjustment. In Fig. 8, I have illustrated such a construction. In this instance, the shank of the screw 18 is long enough to extend completely through the bridge 12$^a$. A spacing block 52 extends between the rear face of the diaphragm and the front face of the bridge; and by means of the nut 53, the parts may be firmly and permanently clamped to the bridge. In this case, the electrical connections are the same as in Fig. 7, while the ring 51 and rivets 27 of said figure are replaced by a ring 51$^a$ which has the rivet projections 27$^a$ formed integral therewith. This construction is preferably obtained by compressing a blank ring between suitable dies, and, by its use, a great saving of time in assembling the parts is obtained. At this point, it may be stated that, by reason of the initial bias given to the sound diaphragm, the variation in resistance of the carbon granules, due to heat caused by the current flowing therethrough, is counteracted by the relative movement of the electrodes, due to the heating of the diaphragm and attached cup. For example, referring to the transmitter illustrated in Fig. 1, in using the instrument, at first the granular material 31 between the electrodes 29' and 30 will offer a given resistance. As the use is continued, this body of material and the adjacent parts become heated. The heating of the granular mass tends to decrease its resistance, while the heating of the adjacent portions of the diaphragm 16 and cup 26 tends to expand the metal of which they are composed, thereby separating the electrodes 29' and 30 slightly and increasing the resistance of the body of granular material. In this way, one effect is largely or wholly neutralized by the other, and the resistance of the granular mass is maintained more nearly constant, and this is true for lines of varying resistances in connection with which similar instruments are used. It will also be apparent that the electrodes of Fig. 1 may be modified considerably. For example, the diaphragm itself may serve as a rear electrode, as illustrated in Fig. 5. In this case, the stem 17$^a$ has its forward end reduced so as to form a rivet by which it is connected to the diaphragm 16. Preferably, the portion of the diaphragm opposite the electrode 30 is polished and plated with gold or platinum, while the cup 26$^a$ is made somewhat shallower than the cup 26 of Fig. 1 in order to maintain the proper electrode separation, and is also spaced slightly from the periphery of said electrode so as to leave a circular place for the circulation of the granular material. The cup 26$^a$ is also insulated from the diaphragm 16, but electrically connected to the ring 51 by the rivets 27. In using this construction in the frame of Fig. 1, connection is established with the binding post 36 by the strip 38, as heretofore described.

In Fig. 6, the cup 26$^b$ serves as the front electrode and has its electrode surface preferably polished and plated with gold or platinum, similarly to that of the diaphragm 16 of Fig. 5. In this instance, the electrical connections are the same as in Fig. 1, but the cup is made somewhat shallower so as to maintain the proper electrode separation. In still other instances, it may be desirable to employ concentric electrodes. These may be carried directly by the cup, as illustrated in Fig. 10, or by the diaphragm, as illustrated in Fig. 11. In the construction of Fig. 10, the cup 26$^c$ is secured to the diaphragm 16 by rivets 27, as before, and the stem 17 is secured to the diaphragm, as in Fig. 1, by a screw 18, whose head in this case serves not as an electrode or electrode support, as in said figure, but as a shunt plate to the concentric electrodes 54—55. The head of the electrode 55 overhangs a portion of the electrode 54 which, together with the cup 26$^c$, is perforated for the passage of its shank, and a nut 56 on the shank securely clamps the parts in position. The cup 26$^c$ and the outer electrode 54 are in electrical engagement, while the interior electrode 55 is insulated therefrom by the insulation 57, which extends slightly beyond the face of the electrodes 54 and 55, as a barrier therebetween. The outer electrode 54 may be electrically connected, through the cup 26$^c$ and the diaphragm 16, to a binding post as in Fig. 1, while the inner electrode 55 is connected to the other binding post by a flexible conductor 58 extending through a suitable opening in the diaphragm, provided with a bushing 59.

When the concentric electrodes are carried by the diaphragm as in Fig. 11, the electrodes 54$^a$ and 55$^a$ are preferably provided with concentric shanks which extend through an opening in the diaphragm and are insulated from each other and the diaphragm by suitable insulation 60—61, the latter, as in the case of insulation 57, extending slightly beyond the face of the electrodes 54 and 55. A sleeve 62 in electrical engagement with the shank of the outer electrode 54$^a$, and abutting against the outer face of the diaphragm 16 through the interposed insulation 60, coöperates with a nut 63, carried by the outer end of the shank of the electrode 55$^a$, to clamp the parts together.

Any suitable electrical connections may be made with the electrodes 54ª—55ª.

As alternative to the electrode construction of Fig. 1, the carbon disk 30, constituting the front electrode, may be secured directly to a disk 29ª and the latter may be soldered in position in the cup 26, as illustrated in Fig. 8. It will be apparent that still other alterations and modifications may be made without departing from the spirit and scope of my invention. I, therefore, do not wish to be limited to the specific matter illustrated and described, but aim to cover, by the terms of the appended claims, all such alterations and modifications.

From the above considerations, it is thus clear that I have produced a transmitter in which the resistance of the resistance varying medium between the electrodes is caused to vary not only as a result of the piston-like action of the electrodes, but also by the agitation and vibration of the resistance varying material as a whole. By reason of this latter agitation, the inertia of the granules comprising the resistance varying material produces resistance changes which more perfectly reproduce the overtones, and especially the higer overtones, of impressed sound waves.

What I claim as new and desire to secure by Letters Patent of the United States is:—

1. A telephone transmitter comprising a substantially plane sound-receiving diaphragm fixed at its center, a granule chamber mounted thereon, coöperating electrodes within said chamber, and a body of granular resistance-varying material between said electrodes.

2. A telephone transmitter comprising a sound-receiving diaphragm fixed at its center and having substantially the same resiliency throughout, a granule chamber mounted thereon, coöperating electrodes within said chamber, and a body of granular resistance-varying material between said electrodes.

3. A telephone transmitter comprising a substantially plane sound-receiving diaphragm fixed at its center and having substantially the same resiliency throughout, a granule chamber mounted thereon, coöperating electrodes within said chamber, and a body of granular resistance-varying material between said electrodes.

4. A telephone transmitter comprising a substantially plane sound-receiving diaphragm, a cup secured to one side of said diaphragm so as to form a granule chamber therewith, an electrode secured to the bottom of said cup and movable therewith, a coöperating electrode secured to said diaphragm and holding the latter immovable at its center, and a body of granular resistance-varying material between said electrodes.

5. A telephone transmitter comprising a sound-receiving diaphragm fixed at its center, a coöperating granule chamber having the interior of its peripheral walls extending obliquely to the direction of movement of the diaphragm, coöperating electrodes within said chamber, and a body of granular resistance-varying material between said electrodes.

6. A telephone transmitter comprising a sound-receiving diaphragm fixed at its center a coöperating granule chamber, coöperating electrodes located at opposite sides of said chamber and a body of granular resistance-varying material between said electrodes, said chamber having the interior of the walls adjacent to the outer edges of said electrodes inclined to the direction of movement of said electrodes.

7. A telephone transmitter comprising a sound-receiving diaphragm fixed at its center, a cup secured to one side of said diaphragm so as to form a granule chamber therewith and having the interior of its outer walls inclined to the plane of said diaphragm, an electrode secured to the bottom of said cup and movable therewith, a coöperating electrode secured to said diaphragm opposite its mate, and a body of granular resistance-varying material between said electrodes.

8. A telephone transmitter comprising a supporting frame, a mouth-piece secured to the front of said frame, a substantially plane sound-receiving diaphragm opposite the opening of said mouth-piece, means for rigidly connecting the center of said diaphragm to said frame, a cup secured to the front of said diaphragm to form a granule chamber therewith, coöperating electrodes within said chamber, and a body of granular resistance-varying material between said electrodes.

9. A telephone transmitter comprising a front plate, a mouth-piece secured thereto, a substantially plane sound-receiving diaphragm opposite the opening of said mouth-piece, a bridge at the rear of said diaphragm, means for rigidly connecting the center of said diaphragm to said bridge, a cup secured to the front of said diaphragm to form a granule chamber therewith, coöperating electrodes within said chamber, and a body of granular resistance-varying material between said electrodes.

10. A telephone transmitter comprising a front plate, a mouth-piece secured thereto, a substantially plane sound-receiving diaphragm opposite the opening of said mouth-piece, a bridge at the rear of said diaphragm, means for rigidly connecting the center of said diaphragm to said bridge, a cup secured to the front of said diaphragm to form a granule chamber therewith, an electrode secured to the bottom of said cup and movable therewith, a fixed coöperating electrode, and a body of granular resistance-varying material between said electrodes.

11. A telephone transmitter comprising a front plate, a mouth-piece secured thereto, a substantially plane sound-receiving diaphragm opposite the opening of said mouth-piece, a bridge at the rear of said diaphragm, means for rigidly connecting the center of said diaphragm to said bridge, a cup secured to the front of said diaphragm to form a granule chamber therewith, coöperating electrodes within said chamber, a body of granular resistance-varying material between said electrodes, and means for giving said diaphragm an initial flexure.

12. A telephone transmitter comprising a front plate, a mouth-piece secured thereto, a substantially plane sound-receiving diaphragm opposite the opening of said mouth-piece, a bridge at the rear of said diaphragm, means for rigidly connecting the center of said diaphragm to said bridge, a cup secured to the front of said diaphragm to form a granule chamber therewith, coöperating electrodes within said chamber, a body of granular resistance-varying material between said electrodes, and a spring arranged to press against the rear of said diaphragm to give it an initial flexure.

13. A telephone transmitter comprising a supporting frame, a mouth-piece secured to the front of said frame, a substantially plane sound-receiving diaphragm opposite the opening of said mouth-piece, means for rigidly connecting the center of said diaphragm to said frame, a cup having inclined peripheral walls secured to the front of said diaphragm so as to form a granule chamber therewith, coöperating electrodes within said chamber, and a body of granular resistance-varying material between said electrodes.

14. A telephone transmitter comprising a front plate, a mouth-piece secured thereto, a sound-receiving diaphragm opposite the opening of said mouth-piece, a bridge at the rear of said diaphragm, means for rigidly connecting the center of said diaphragm to said bridge, a cup having inclined peripheral walls secured to the front of said diaphragm so as to form a granule chamber therewith, coöperating electrodes within said chamber, and a body of granular resistance-varying material between said electrodes.

15. A telephone transmitter comprising a front-plate, a mouth-piece secured thereto, a sound-receiving diaphragm opposite the opening of said mouth-piece, a bridge at the rear of said diaphragm, means for rigidly connecting the center of said diaphragm to said bridge, a cup having inclined peripheral walls secured to the front of said diaphragm so as to form a granule chamber therewith, an electrode secured to the bottom of said cup and movable therewith, a coöperating electrode secured to said diaphragm opposite its mate, and a body of granular resistance-varying material between said electrodes.

16. A telephone transmitter comprising a front plate, a mouth-piece secured thereto, a sound-receiving diaphragm opposite the opening of said mouth-piece, a bridge at the rear of said diaphragm, means for rigidly connecting the center of said diaphragm to said bridge, a cup having inclined peripheral walls secured to the front of said diaphragm so as to form a granule chamber therewith, coöperating electrodes within said chamber, a body of granular resistance-varying material between said electrodes, and means for giving said diaphragm an initial flexure.

17. A telephone transmitter comprising a front plate, a mouth-piece secured thereto, a sound-receiving diaphragm opposite the opening of said mouth-piece, a bridge at the rear of said diaphragm, means for rigidly connecting the center of said diaphragm to said bridge, a cup having inclined peripheral walls secured to the front of said diaphragm so as to form a granule chamber therewith, an electrode secured to the bottom of said cup and movable therewith, a coöperating electrode secured to said diaphragm opposite its mate, a body of granular resistance-varying material between said electrodes, and means for giving said diaphragm an initial flexure.

18. A telephone transmitter comprising a front plate, a mouth-piece secured thereto, a sound-receiving diaphragm opposite the opening of said mouth-piece, a bridge at the rear of said diaphragm, means for rigidly connecting the center of said diaphragm to said bridge, a cup having inclined peripheral walls secured to the front of said diaphragm so as to form a granule chamber therewith, an electrode secured to the bottom of said cup and movable therewith, a coöperating electrode secured to said diaphragm opposite its mate, a body of granular resistance-varying material between said electrodes, and a spring engaging the rear of said diaphragm to give it an initial flexure.

19. A telephone transmitter comprising a substantially plane diaphragm, a granule chamber mounted thereon, coöperating electrodes in said chamber, a stem secured to the center of said diaphragm, a support for said stem, and means for immovably securing the stem in its support in different positions.

20. A telephone transmitter comprising a substantially plane sound-receiving diaphragm fixed at its center, a support having a bearing face against which the periphery of said diaphragm is adapted to bear, means for adjusting the center of said diaphragm relative to the said bearing face, a granule chamber mounted on said diaphragm, cooperating electrodes within said chamber, and a body of granular resistance-varying material between said electrodes.

21. A telephone transmitter comprising a sound-receiving diaphragm fixed at its center and having substantially the same resiliency throughout, a support having a bearing face against which the periphery of said diaphragm is adapted to bear, means for adjusting the center of said diaphragm relative to the said bearing face, a granule chamber mounted on said diaphragm, coöperating electrodes within said chamber, and a body of granular resistance varying material between said electrodes.

22. A telephone transmitter comprising a substantially plane sound-receiving diaphragm fixed at its center and having substantially the same resiliency throughout, a support having a bearing face against which the periphery of said diaphragm is adapted to bear, means for adjusting the center of said diaphragm relative to the said bearing face, a granule chamber mounted on said diaphragm, coöperating electrodes within said chamber, and a body of granular resistance-varying material between said electrodes.

23. A telephone transmitter comprising a substantially plane sound-receiving diaphragm, a support having a bearing face against which the periphery of said diaphragm is adapted to bear, a cup secured to one side of said diaphragm so as to form a granule chamber therewith, an electrode secured to the bottom of said cup and movable therewith, a coöperating electrode fixed to said diaphragm at its center, means for adjusting the center of said diaphragm relative to the said bearing surface, and a body of granular resistance-varying material between said electrodes.

24. A telephone transmitter comprising a sound-receiving diaphragm fixed at its center, a support having a bearing face against which the periphery of said diaphragm is adapted to bear; a coöperating granule chamber having the interior of its peripheral walls extending obliquely to the direction of movement of the diaphragm, means for adjusting the center of said diaphragm relative to the said bearing surface, and a body of granular resistance-varying material between said electrodes.

25. A telephone transmitter comprising a sound-receiving diaphragm fixed at its center, a support having a bearing face against which the periphery of said diaphragm is adapted to bear, a coöperating granule chamber, coöperating electrodes located at opposite sides of said chamber and a body of granular resistance-varying material between said electrodes, said chamber having the interior of its walls adjacent to the outer edges of said electrodes inclined to the direction of movement of said electrodes, and means for adjusting the center of said diaphragm relative to the said bearing surface.

26. A telephone transmitter comprising a sound-receiving diaphragm fixed at its center, a support having a bearing face against which the periphery of said diaphragm is adapted to bear, a cup secured to one side of said diaphragm so as to form a granule chamber therewith and having the interior of its outer walls inclined to the plane of said diaphragm, an electrode secured to the bottom of said cup and movable therewith, a coöperating electrode secured to said diaphragm opposite its mate, a body of granular resistance-varying material between said electrodes, and means for adjusting the center of said diaphragm relative to the said bearing surface.

27. A telephone transmitter comprising a supporting frame, a mouth-piece secured to said frame, a substantially plane sound-receiving diaphragm opposite the opening of said mouth-piece, means for adjustably securing the center of said diaphragm rigidly to said frame and substantially fixing the periphery of said diaphragm, a cup secured to the front of said diaphragm to form a granule chamber therewith, coöperating electrodes within said chamber, and a body of granular resistance-varying material between said electrodes.

28. A telephone transmitter comprising a supporting frame, a mouth-piece secured to said frame, a substantially plane sound-receiving diaphragm opposite the opening of said mouth-piece, means for rigidly connecting the center of said diaphragm to said frame, a cup secured to said diaphragm to form a granule chamber therewith, coöperating electrodes within said chamber, and a body of granular resistance-varying material between said electrodes.

29. A telephone transmitter comprising a supporting member, a mouth-piece secured thereto, a substantially plane sound-receiving diaphragm opposite the opening of said mouth-piece, a bridge, means for rigidly connecting the center of said diaphragm to said bridge, a cup secured to said diaphragm to form a granule chamber therewith, coöperating electrodes within said chamber, and a body of granular resistance-varying material between said electrodes.

30. A telephone transmitter comprising a supporting member, a mouth-piece secured thereto, a substantially plane sound-receiving diaphragm opposite the opening of said mouth-piece, a bridge, means for rigidly connecting the center of said diaphragm to said bridge, a cup secured to one side of said diaphragm to form a granule chamber therewith, an electrode secured to the bottom of said cup and movable therewith, a fixed coöperating electrode, and a body of granular resistance-varying material between said electrodes.

31. A telephone transmitter comprising a supporting member, a mouth-piece secured thereto, a substantially plane sound-receiving diaphragm opposite the opening of said mouth-piece, a bridge, means for rigidly connecting the center of said diaphragm to said bridge, a cup secured to one side of said diaphragm to form a granule chamber therewith, coöperating electrodes within said chamber, a body of granular resistance-varying material between said electrodes, and means for giving said diaphragm an initial flexure.

32. A telephone transmitter comprising a supporting member, a mouth-piece secured thereto, a substantially plane sound-receiving diaphragm opposite the opening of said mouth-piece, a bridge, means for rigidly connecting the center of said diaphragm to said bridge, a cup secured to one side of said diaphragm to form a granule chamber therewith, coöperating electrodes within said chamber, a body of granular resistance-varying material between said electrodes and a spring arranged to press against said diaphragm to give it an initial flexure.

In witness whereof, I hereunto subscribe my name this 13 day of March, 1906.

WILLIAM KAISLING.

Witnesses:
CAROLYN WEBER,
T. H. FERGUSON.